(12) United States Patent
Hu et al.

(10) Patent No.: US 11,109,042 B2
(45) Date of Patent: Aug. 31, 2021

(54) EFFICIENT CODING OF VIDEO DATA IN THE PRESENCE OF VIDEO ANNOTATIONS

(71) Applicant: Apple Inc., Cupertino, CA (US)

(72) Inventors: Sudeng Hu, San Jose, CA (US); Xing Wen, Cupertino, CA (US); Jae Hoon Kim, San Jose, CA (US); Peikang Song, San Jose, CA (US); Hang Yuan, San Jose, CA (US); Dazhong Zhang, Milpitas, CA (US); Xiaosong Zhou, Campbell, CA (US); Hsi-Jung Wu, San Jose, CA (US); Christopher Garrido, Cupertino, CA (US); Ming Jin, Cupertino, CA (US); Patrick Miauton, Cupertino, CA (US); Karthick Santhanam, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/420,740

(22) Filed: May 23, 2019

(65) Prior Publication Data
US 2019/0373270 A1    Dec. 5, 2019

Related U.S. Application Data

(60) Provisional application No. 62/678,380, filed on May 31, 2018.

(51) Int. Cl.
*H04N 19/172* (2014.01)
*H04N 19/182* (2014.01)
(Continued)

(52) U.S. Cl.
CPC ......... *H04N 19/172* (2014.11); *H04N 19/124* (2014.11); *H04N 19/159* (2014.11);
(Continued)

(58) Field of Classification Search
CPC .... H04N 19/172; H04N 19/176; H04N 19/52; H04N 19/124; H04N 19/159; H04N 19/182
(Continued)

(56) References Cited

U.S. PATENT DOCUMENTS

| | | | |
|---|---|---|---|
| 5,767,845 A * | 6/1998 | Oashi ................... | G11B 27/034 345/475 |
| 7,286,711 B2 | 10/2007 | Bottou et al. | |

(Continued)

FOREIGN PATENT DOCUMENTS

| | | |
|---|---|---|
| CN | 101213833 A | 7/2008 |
| CN | 102246532 A | 11/2011 |

(Continued)

OTHER PUBLICATIONS

D. Grois et al., "Recent Advances in Region-of-Interest Video Coding", Ben-Gurion University of the Negev, Beer-Sheva, Israel; www.intechopen.com; pp. 50-77.

*Primary Examiner* — Reza Aghevli
(74) *Attorney, Agent, or Firm* — BakerHostetler

(57) ABSTRACT

Systems and methods for coding a video to be overlaid by annotations are devised. A motion compensated predictive coding is employed, wherein coding parameters of video pixel blocks are determined based on the pixel blocks' relation to the annotations. A decoder decodes the video and annotates it based on metadata, obtained from the coder or other sources, describing the annotations' appearance and rendering mode.

28 Claims, 8 Drawing Sheets

(51) Int. Cl.
*H04N 19/124* (2014.01)
*H04N 19/176* (2014.01)
*H04N 19/52* (2014.01)
*H04N 19/159* (2014.01)

(52) U.S. Cl.
CPC ......... *H04N 19/176* (2014.11); *H04N 19/182* (2014.11); *H04N 19/52* (2014.11)

(58) Field of Classification Search
USPC .................................................. 375/240.12
See application file for complete search history.

(56) References Cited

U.S. PATENT DOCUMENTS

| | | | | |
|---|---|---|---|---|
| 7,536,705 | B1 * | 5/2009 | Boucher | H04L 12/1836 725/112 |
| 8,750,384 | B2 * | 6/2014 | Pettersson | H04N 21/8146 375/240.24 |
| 9,681,165 | B1 * | 6/2017 | Gupta | H04N 21/4122 |
| 10,721,502 | B2 * | 7/2020 | Yang | H04N 21/4722 |
| 2008/0025196 | A1 * | 1/2008 | Karaoguz | H04L 29/06027 370/206 |
| 2010/0278450 | A1 | 11/2010 | Derrenberger et al. | |
| 2010/0328425 | A1 * | 12/2010 | Nagaraj | H04N 19/27 348/42 |
| 2011/0243246 | A1 * | 10/2011 | Pettersson | H04N 21/4318 375/240.24 |
| 2016/0073155 | A1 * | 3/2016 | Subramaniam | H04N 21/4316 725/32 |
| 2017/0154473 | A1 | 7/2017 | Goossens | |
| 2018/0176618 | A1 * | 6/2018 | Yang | H04N 21/8358 |
| 2018/0220169 | A1 * | 8/2018 | Yang | H04N 21/8586 |
| 2019/0238599 | A1 * | 8/2019 | Ingale | H04L 67/42 |
| 2019/0246147 | A1 * | 8/2019 | Yang | H04N 21/643 |

FOREIGN PATENT DOCUMENTS

| | | | | |
|---|---|---|---|---|
| CN | 103221896 A | | 7/2013 | |
| KR | 20080025196 A | * | 3/2008 | ............. H02P 6/085 |

* cited by examiner

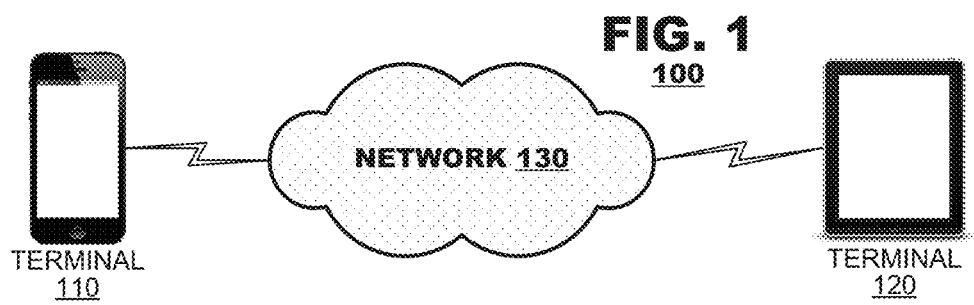
FIG. 1
100
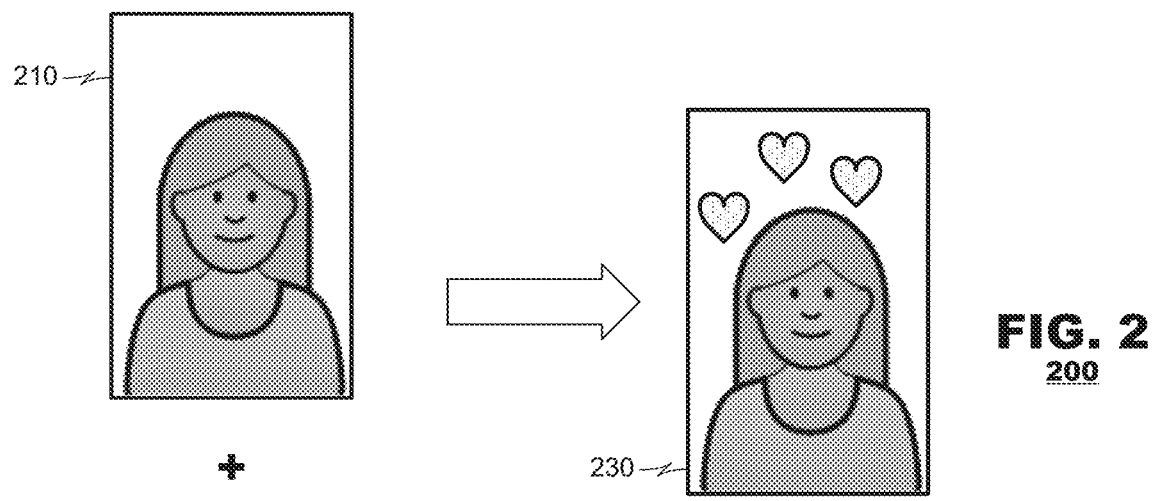
FIG. 2
200
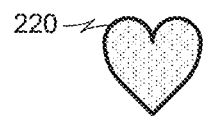

300

400

500

600

700

800

900

1000

EFFICIENT CODING OF VIDEO DATA IN THE PRESENCE OF VIDEO ANNOTATIONS

CROSS REFERENCE TO RELATED APPLICATIONS

This application claims the benefit of U.S. Provisional Patent App. No. 62/678,380, filed May 31, 2018, the disclosure of which is hereby incorporated by reference herein.

BACKGROUND

The present disclosure relates to video coding.

Modern video coding applications apply bandwidth compression to video data to facilitate transmission of the video over bandwidth-constrained communication resources. Oftentimes, the bandwidth compression operations induce coding losses, which causes the video data recovered by a receiver device to possess errors when compared to the source video that it represents. Excessive coding losses can become noticeable by a viewer, which reduces satisfaction with the video coding session.

BRIEF DESCRIPTION OF THE DRAWINGS

FIG. 1 illustrates a video coding system according to an aspect of the present disclosure.

FIG. 2 illustrates exemplary video composition service according to an aspect of the present disclosure.

DETAILED DESCRIPTION

Figure 3:
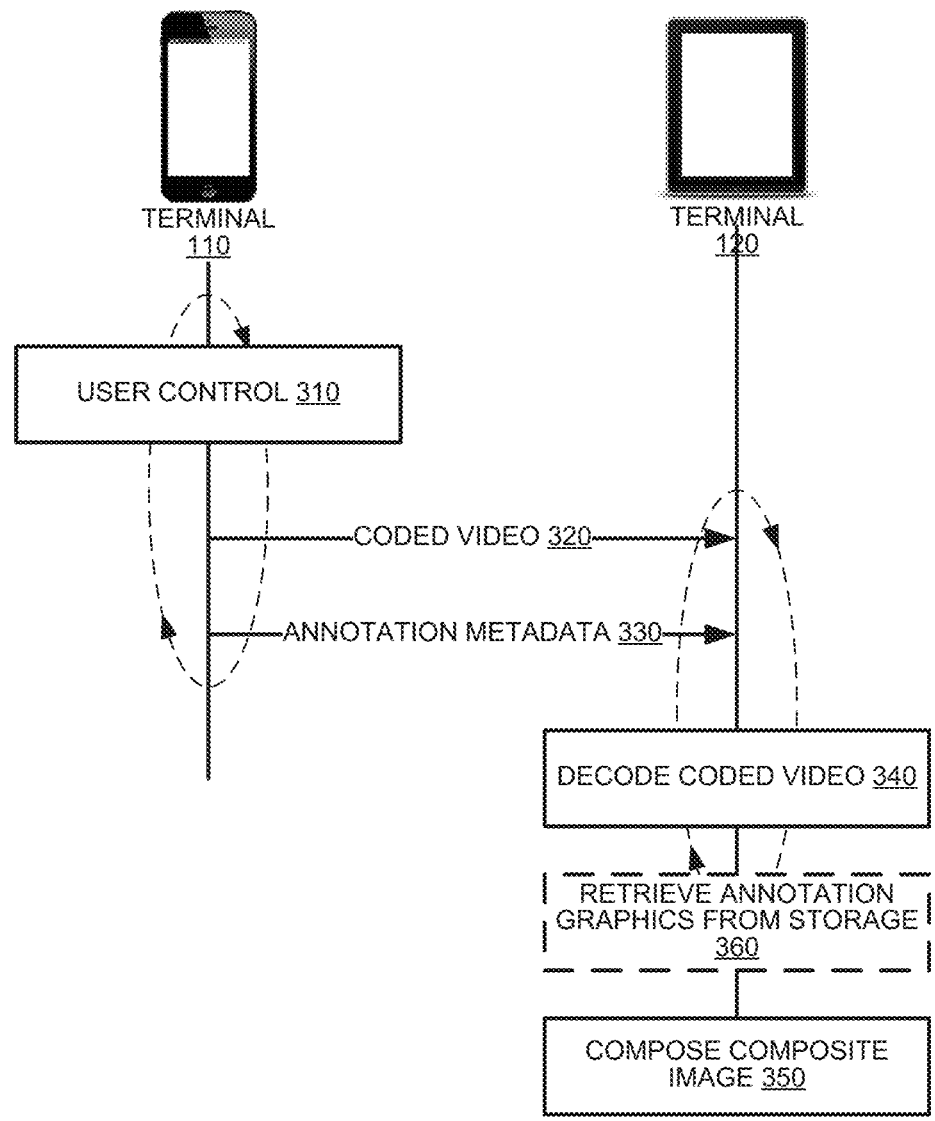
FIG. 3 illustrates a communication flow according to an aspect of the present disclosure.

The inventors propose techniques to code video data in the presence of annotations that may obscure certain regions of the video when it is displayed. In a first aspect, a source video sequence, not yet containing overlaid graphical element(s) (i.e., annotation(s)), may be coded independently of the graphical element(s) and may be transmitted to a receiving device. The receiving device may decode the coded video data and may perform composition operations in which it may overlay the graphical element(s) over the decoded video data. The receiving device may store the graphical element(s) locally, it may receive the graphical element(s) from the device that generates the coded video, or it may receive the graphical element(s) from another network source (for example, an Internet server).

In other aspects, a video coder may alter its coding operations based on the presence, content, and/or location of the annotations. For example, for portions of a video sequence that may be obscured by an annotation, the video coder may lower the bitrate budget allocated for coding these respective portions or it may drive a coding mode for these portions that induces lower quality coding. In another aspect, the video coder may decrease error resiliency coding strength for pixel blocks that are so obscured. In a further embodiment, based on an annotation's characteristics (e.g., type or content), the video coder may increase the bitrate budget for pixel blocks that are adjacent to the annotation. In this manner, coding efficiency may be increased, obtaining maximal coding quality for the video coder's overall available bitrate budget.

In an aspect, a video to be overlaid by a graphical element may be coded by a coder. The coder may receive metadata that include information about the appearance of the graphical element and the manner in which the graphical element may be rendered in the video. The coder may partition the video into pixel blocks and may select coding parameters for each pixel block based on a relation between the pixel block and the graphical element. Then each pixel block may be coded according to its respective selected coding parameters. The coder may reduce the bitrate budget allocation of a pixel block that is overlapped by the graphical element or fully obscured by it. Furthermore, the coder may increase the bitrate budget allocation of a pixel block that is adjacent to the graphical element. Similarly, the error resiliency coding strength may be decreased when a pixel block is overlapped by the graphical element and may be increased when a pixel block is adjacent to the graphical element.

FIG. 1 illustrates a video coding system 100 according to an aspect of the present disclosure. The system 100 may include a pair of terminals 110, 120 in communication via a network 130. The first terminal 110 may code video data for bandwidth compression and deliver the coded video data to the second terminal 120 via the network 130. The second terminal 120 may decode the coded video data and consume video data recovered therefrom. The first terminal 110 may code video that was generated locally or remotely—i.e., may code video obtained from any of a number of sources, including, for example, a camera system, a local storage, or an application that executes on the first terminal 110. The second terminal 120 may consume the video in a variety of ways, including, for example, displaying the video on a local display, storing the video, and/or processing it by an application that executes on the second terminal 120.

In some use cases, the terminals 110, 120 may engage in bidirectional exchanges of video. In such cases, the second terminal 120 may code video data, generated locally or remotely, employing bandwidth compression, and may transmit it to the first terminal 110 for local consumption. Here, again, the second terminal 120 may code video obtained via a camera system, local storage, or an application that executes on the second terminal 120. Similarly, the first terminal 110 may consume received video in a variety of ways, including, for example, displaying the video on a local display, storing the video, and/or processing it by an application that executes on the first terminal 110. There is no requirement that either terminal 110, 120 performs the same methods of video generation and/or consumption as the other.

The network 130 represents any number of communication and/or computer networks that provide communication between the terminals 110, 120. The network 130 may include wired networks, wireless networks, or a combination thereof that operate in a circuit-switched or packet-switched fashion. Such networks may include the Internet. The operation and topology of the network 130 is immaterial to the present discussion unless discussed herein.

In an aspect, a terminal (e.g., terminal 110) may provide user composition services, e.g., as part of its suite of conferencing tools. Users, for example, may add annotations to source video in the form of graphical elements that originate from sources other than the source(s) from which the video originates. FIG. 2 illustrates one such example where a video sequence 210 may be generated from a first source (a camera, in this example) and icons 220 may be added to the video sequence either as dictated by user control or according to an automatic scheme. In this example, a single icon 220 is replicated three times in a video sequence, yielding a composite video sequence 230 that includes image data from the source video 210 and image data of the icons 220. Although not illustrated in FIG. 2, user annotations may be provided in static locations of an image, they may be animated so that their image data, location(s), perspective, shape, and size(s) vary over the course of a video sequence. Indeed, some annotations may be defined so that they respond to events in the video and/or move automatically to track predetermined object(s) detected within an image. For example, the overlaying (rendering) of a graphical element may be based on an object's motion or an event—a goal in a soccer game or movements of players. When an object of interest is a person, the overlaying (rendering) of the graphical element may be based on that object's facial features, body features, background features, and the like.

FIG. 3 illustrates a communication flow 300 according to an aspect of the present disclosure. As illustrated, the terminals 110, 120 may be engaged in mutual communication. In an aspect, based on user control 310, annotations may be selected in the first terminal 110 to be overlaid on spatial regions of a video stream. In another aspect, annotations may be initiated automatically in response to the video content or other events. The first terminal 110 may deliver information for the communication session as a pair of transmissions 320, 330: A first transmission 320 may include coded video data representing the bandwidth compressed source video, and a second transmission 330 may contain metadata 330 representing the annotations themselves. A receiving terminal 120 may receive both transmissions, decode the coded video 340, and compose a composite image 350 that contains the decoded video and the annotations. Both terminals 110, 120 may repeat this operation in this manner as long as it is desirable for the user of the first terminal 110 or until a point in time determined automatically.

In one aspect, the annotation metadata 330 may include data representing the annotation itself and data representing the manner in which the annotation may be overlaid (rendering mode)—e.g., annotation's shape, texture, location in the video frame, perspective, motion, and dimension. In another aspect, the two terminals 110, 120 may operate according to a protocol in which the annotation metadata are predetermined. For example, the annotation content may be known to both terminals 110, 120 by virtue of a coding service that may be used, operating system specifications, or by pre-loading the annotations into local storage. In an aspect, a first terminal 110 may identify an annotation by its type and may provide other parameter data (e.g., parameters pertaining to the manner in which the annotation may be rendered in the video). In this case, the receiving terminal 120 may have access to that annotation based on its identified type without receiving its content from the first terminal 110. The second terminal 120 may download the annotation's content from a third-party source, for example, a network server (not shown).

Figure 4:
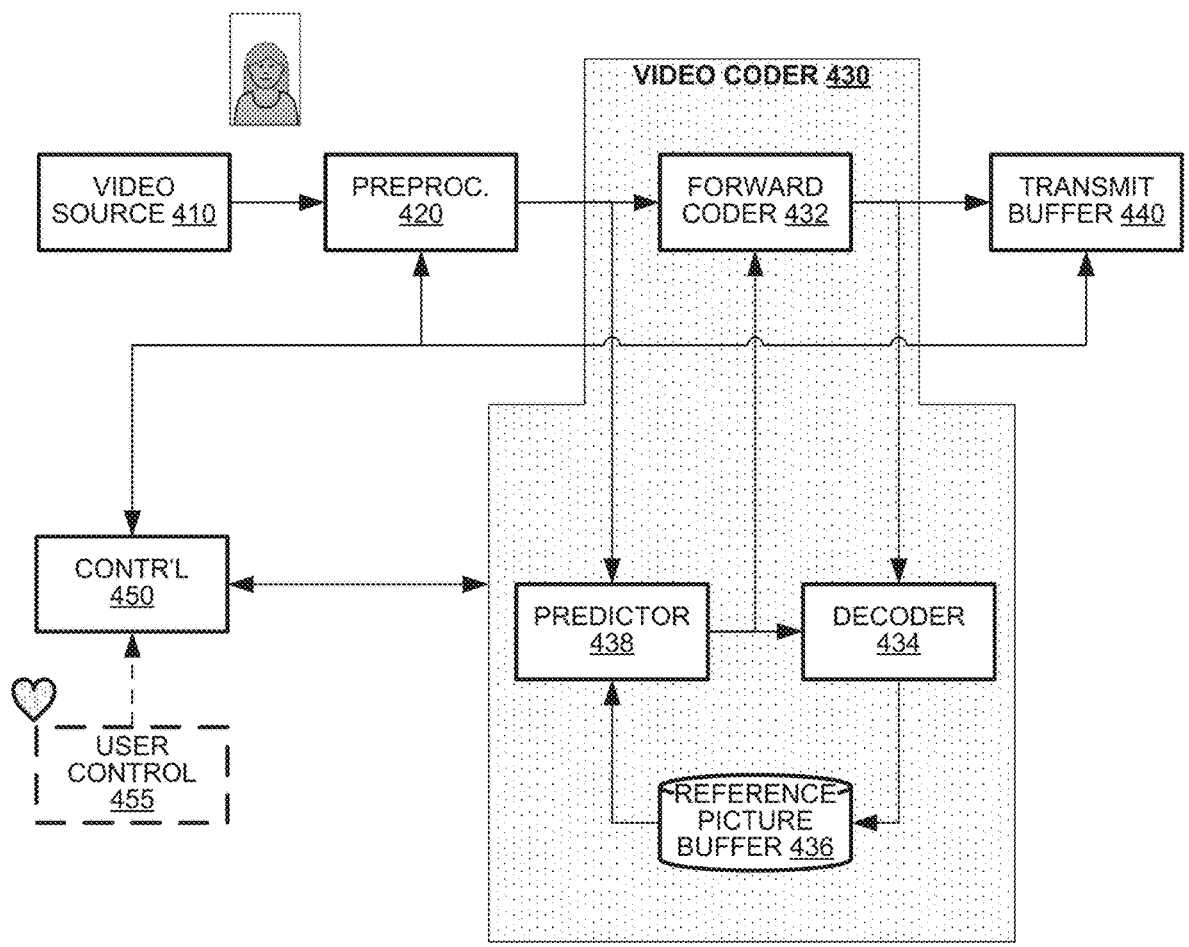
FIG. 4 is a functional block diagram illustrating components of an encoding terminal according to an aspect of the present disclosure.

FIG. 4 is a functional block diagram illustrating components of an encoding terminal according to an aspect of the present disclosure. The encoding terminal may include a video source 410, an image preprocessor 420, a video coding system 430, and a transmission buffer 440, operating under control of a controller 450. The video source 410 may supply video to be coded. The video source 410 may comprise a camera that captures image data of a local environment, an application that generates video data (e.g., computer-generated content), a storage device that stores video from some other sources, or a network connection through which source video data are received. The image preprocessor 420 may perform signal-conditioning operations on the video to be coded to prepare the video data for coding. For example, the preprocessor 420 may alter the frame rate, frame resolution, and/or other properties of the source video. The image preprocessor 420 may also perform filtering operations on the source video such as denoising operations.

The video coding system ("video coder") 430 may perform coding operations on the video to reduce its bandwidth. Typically, the video coder 430 exploits temporal and/or spatial redundancies within the source video. For example, the video coder 430 may perform motion compensated predictive coding in which video frames or field frames may be parsed into sub-units (e.g., pixel blocks). Individual pixel blocks may then be coded differentially with respect to predicted pixel blocks, derived from previously coded video data. A given pixel block may be coded according to any one of a variety of predictive coding modes, such as:

intra-coding, in which an input pixel block may be coded differentially with respect to previously coded/decoded data of a common frame;

single prediction inter-coding, in which an input pixel block may be coded differentially with respect to data of a previously coded/decoded frame; and multi-hypothesis motion compensation predictive coding, in which an input pixel block may be coded predictively using decoded data from two or more sources, via temporal or spatial prediction.

The predictive coding modes, namely differential coding techniques, may be used cooperatively with other coding techniques, such as Transform Skip coding, RRU coding, scaling of prediction sources, palette coding, and the like.

The video coder 430 may include a forward coder 432, a decoder 434, a reference picture buffer 436, and a predictor 438. The coder 432 may apply the differential coding techniques to the input pixel block using predicted pixel block data supplied by the predictor 438. The decoder 434 may invert the differential coding techniques applied by the coder 432 to a subset of coded frames designated as reference frames. The reference picture buffer 436 may store the reconstructed reference frames for use in prediction operations. The predictor 438 may predict input pixel blocks based on reference frames stored in the reference picture buffer 436. The video coder 430 typically operates according to a predetermined coding protocol such as the ITU-T's H.265 (commonly known as "HEVC"), H.264 ("AVC"), or H.263 coding protocols.

The transmission buffer 440 may store coded video data prior to transmission over the network. Typically, the coded video data is formatted to meet the requirements of the coding protocol prior to transmission.

The controller 450 may govern coding related decisions applied by the preprocessor 420 and the video coder 430 as they process and code the video input, respectively. In an aspect, the controller 450 may receive information describing any annotations that may be active with respect to the video being processed by the system 400. In an aspect, the controller 450 may alter coding parameters to increase coding efficiencies and/or coding quality in the presence of annotations. For example, controllers typically may operate according to bitrate budgets for predetermined video elements—frames, slices, and/or pixel blocks. In an aspect, the controller 450 may alter the bitrate budget of elements when they are obscured by or in the vicinity of annotations. In another aspect, the controller 450 may apply predetermined coding modes to coding elements when they are obscured by or in the vicinity of annotations.

The controller 450 may receive an annotation (a graphical element) from a user 455 or may access it remotely or locally from a storage unit. An annotation may be represented by metadata specifying its appearance—shape, color, and texture, for example. The metadata may also include information pertaining to the manner in which the annotation may be overlaid in the video—e.g., location, perceptive, dimension, and motion. In an aspect, metadata's information may be generated or modified by the encoder system 400. For example, the preprocessor 420 may analyze the video frames to determine whether and how a certain annotation may be overlaid in the video, setting the annotation's metadata accordingly. The controller 450 may provide the annotation metadata to the transmission buffer 440 to be packed with the respective coded video and coding parameters.

Figure 5:
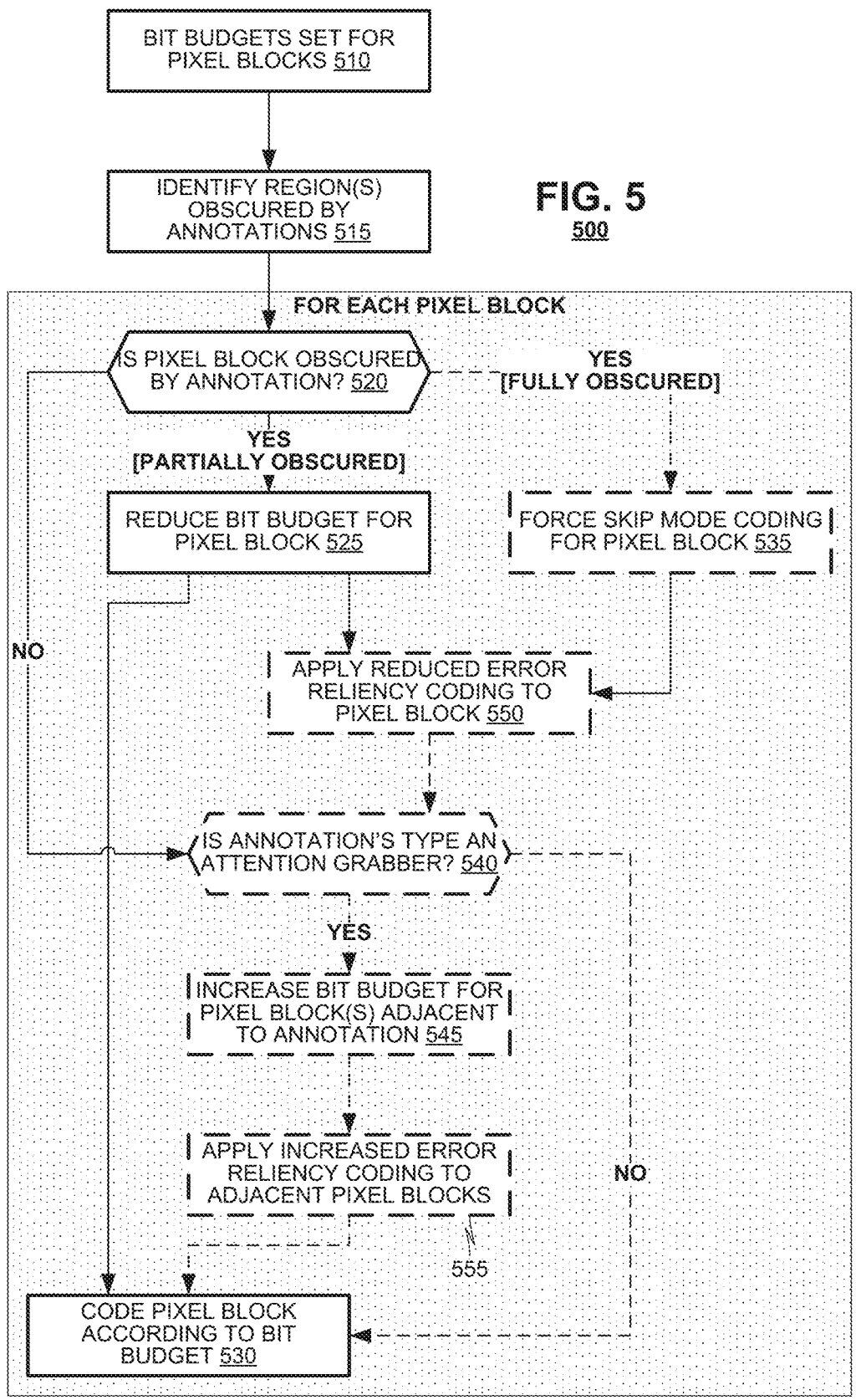
FIG. 5 illustrates a method according to an aspect of the present disclosure.

FIG. 5 illustrates a method 500 according to an aspect of the present disclosure. The method 500 may operate on predetermined regions of a video frame such as blocks, macroblocks, coding units and the like (called "pixel blocks," for convenience). Bitrate budgets may be set for pixel blocks of an image according to a default policy (box 510). Thereafter, the method 500 may identify region(s) of a frame that overlap annotations (box 515). Thereafter, for each pixel block, the method 500 may determine if the pixel block is obscured by an annotation (box 520). If the pixel block is obscured, the method 500 may reduce the bitrate budget for the pixel block (box 525). No revision of the pixel block's bitrate budget need be performed if the pixel block is not obscured. Thereafter, the method 500 may code the pixel block according to its bitrate budget (box 530).

The foregoing techniques permit video coders to lower bitrate budgets that are allocated to obscured pixel blocks, which may include lower quality coding for the obscured pixel blocks but permit the bit rate savings obtained therefrom to be applied to other portions of video. For example, the bit rate savings may be applied to other pixel blocks of the frame or to other frames that will be coded later. Moreover, because the pixel blocks that have reduced bitrate budget will be obscured, it is expected that quality losses that are induced by the lowered bitrate budgets will not be noticeable to viewers.

Figure 6:
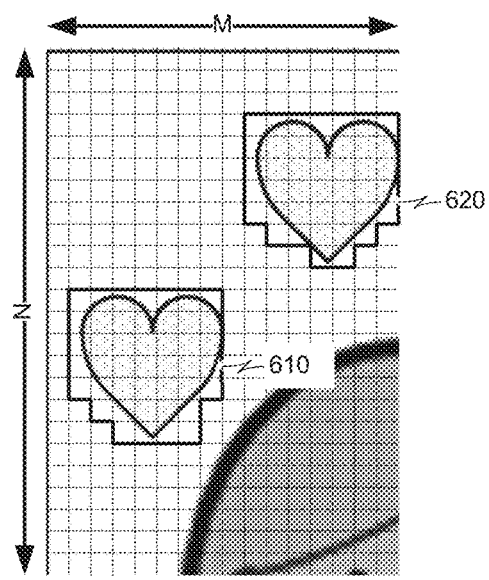
FIG. 6 illustrates a portion of an exemplary frame that may be processed according to an aspect of the present disclosure.

FIG. 6 illustrates a portion of an exemplary frame 600 that may be processed by the method 500 discussed above. In this example, the frame 600 is illustrated as partitioned into pixel blocks, shown as N rows and M columns of pixel blocks for the illustrated portion. Two annotations are illustrates as obscuring first and second pluralities 610, 620 of the pixel blocks. When the method 500 determines that these pixel blocks from the source frame would be obscured by the annotations, the method 500 may alter the way these pixel blocks are coded—e.g., may lower the bitrate budgets for them.

Returning to FIG. 5, in an aspect, the method 500 may distinguish between pixel blocks that are partially obscured by annotations and pixel blocks that fully obscured. When a pixel block is fully obscured, the method 500 may force a SKIP coding mode for the fully obscured pixel block (box 535). In a SKIP coding mode, method 500 may not allocate any bits to the coding of the fully obscured pixel blocks. When a pixel block is partially obscured, the method 500 may reduce the allocated bitrate budget for that block (as discussed with respect to box 525). In an aspect, the reduction of allocated bitrate may be proportional to the degree of overlap—a higher overlap between the pixel block and the overlaid graphical element may result in a higher reduction in bitrate budget allocation.

Figure 7:
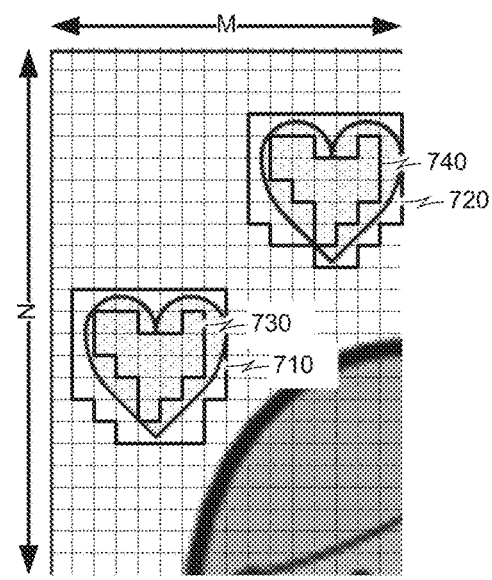
FIG. 7 illustrates a portion of an exemplary frame that may be processed according to an aspect of the present disclosure.

FIG. 7 illustrates a portion of an exemplary frame 700 that may be processed by the method 500 discussed above. Here, again, the frame 700 is illustrated as partitioned into pixel blocks, shown as N rows and M columns of pixel blocks for the illustrated portion. Two annotations are illustrates as obscuring first and second pluralities 710, 720 of the pixel blocks. When the method 500 distinguishes fully obscured pixel blocks from partially obscured pixel blocks, the method 500 may identify pixel blocks and the regions 730 and 740 as being fully obscured. The pixel blocks in these regions may be processed as discussed for box 535 (FIG. 5). The remaining pixel blocks in the regions 710, 720 may be identified as partially obscured, and they may be processed as discussed for box 525.

Returning to FIG. 5, in another aspect, the method 500 may adjust bitrate budgets for pixel blocks that are associated with the annotations, denoted "adjacent" pixel blocks. Adjacent pixel blocks may not necessarily overlap with any graphical elements. The determination of whether a pixel block is an adjacent pixel block may be based on a relation between the graphical element and the video content associated with the pixel block. If a pixel block is determined to be an adjacent pixel block the method 500 may increase the bitrate allocation for that pixel block (box 545). In an aspect, the method 500 may recognize an object of interest in a video region that the graphical element refers to; for example, a graphical element may contain the name of the recognized object. Based on this reference, a pixel block that is associated with the video region may be determined to be adjacent to the graphical element. In another aspect, determining that a pixel block is adjacent to the graphical element may be based on a correlation between the characteristics of a video associated with the pixel block and the characteristics of the graphical element.

The method 500 may distinguish annotations by their type. Some annotations such as circles, arrows, and other pointer-based annotations may be provided to draw a viewer's attention to selected regions of the video image. These types of annotations are referred to here as "attention grabbers." In an aspect, the method 500 may determine whether an annotation is an attention grabber (box 540). If so, the method 500 may increase the bitrate budget for pixel block(s) that are adjacent to the annotation (box 545) prior to coding these adjacent pixel blocks (box 530). In this manner, the pixel blocks that are indicated by the annotation may be denoted as adjacent pixel blocks and may receive a relatively higher bitrate budget allocation, which may contribute to higher-quality coding of those adjacent pixel blocks.

Hence, in an aspect, pixel blocks that are located in regions of directional annotations' tips (e.g., arrows or other pointer-based annotations) may be identified as adjacent pixel blocks that may receive increased bitrate budgets. Similarly, annotations that enclose regions of an image (such as circles) may result in an increased bitrate budget allocations for the enclosed regions. Furthermore, as discussed, the method 500 may employ object recognition processes based on which it may determine whether an annotation refers to a recognized object in the image data; in such a case, increased bitrate budget may be applied to the coding of an image region associated with the object referenced by the annotation, regardless of its proximity to the annotation or whether it is fully enclosed by the annotation.

In a further aspect, the method 500 may modify error resiliency processes based on image data's relationship to an annotation. For example, when a pixel block is obscured by an annotation, the method 500 may also decrease the strength of error resiliency applied to the coded data of that pixel block (box 550). Similarly, when a pixel block has an increased bitrate budget applied to it, the method 500 may also increase the error resiliency coding to the respective pixel block (box 555). Increases or decreases of error resiliency coding may occur by increasing or decreasing, respectively, the number of bits allocated to forward error correction coding of the coded pixel blocks.

Figure 8:
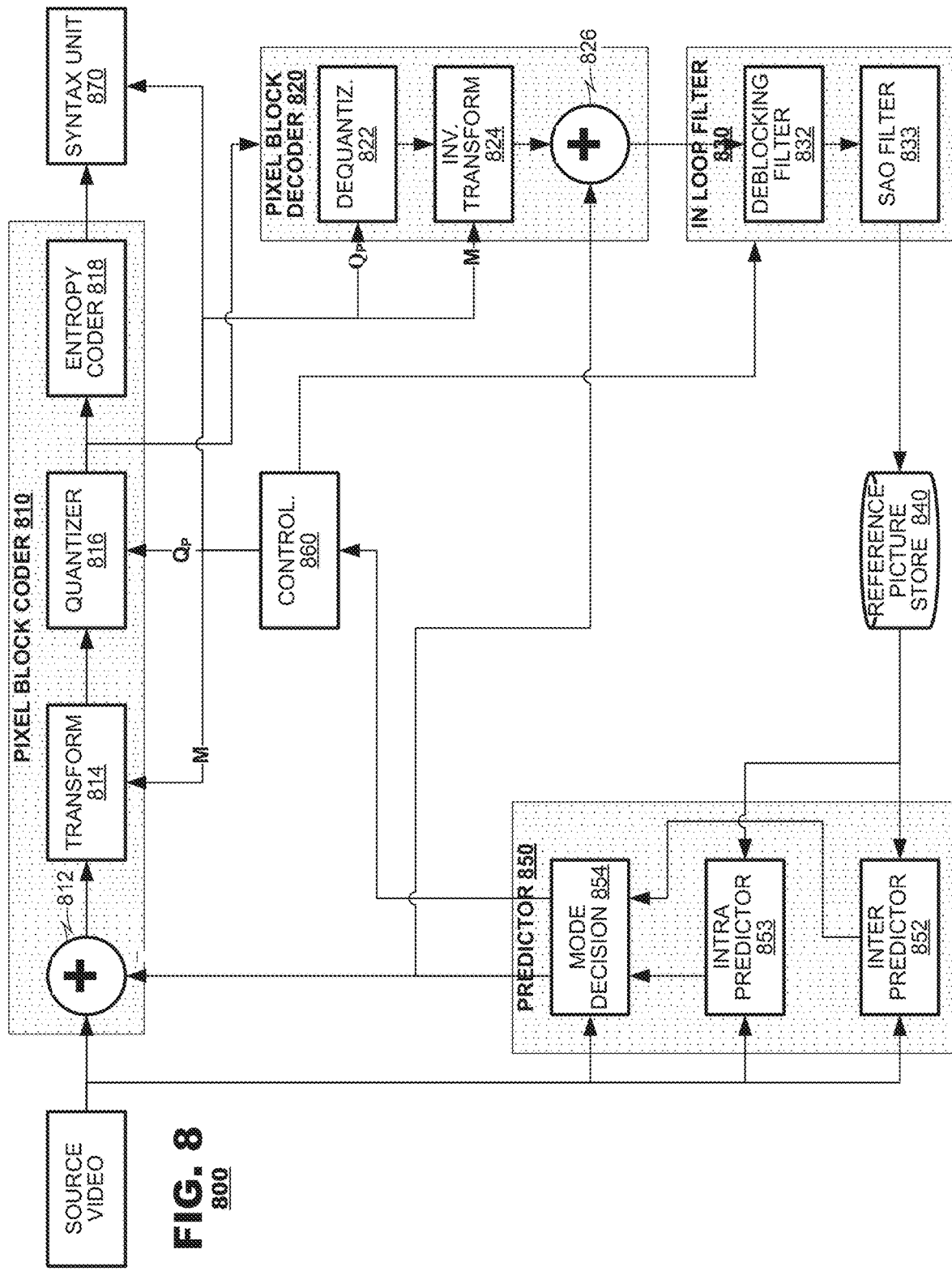
FIG. 8 is a functional block diagram of a coding system according to an aspect of the present disclosure.

FIG. 8 is a functional block diagram of a coding system 800 according to an aspect of the present disclosure. The system 800 may include a pixel block coder 810, a pixel block decoder 820, an in-loop filter system 830, a reference frame store 840, a predictor 850, a controller 860, and a syntax unit 870. The predictor 850 may predict image data for use during coding of a newly-presented input pixel block and it may supply a prediction block representing the predicted image data to the pixel block coder 810. The pixel block coder 810 may code the new pixel block by predictive coding techniques and present coded pixel block data to the syntax unit 870. The pixel block decoder 820 may decode the coded pixel block data, generating decoded pixel block data therefrom. The in-loop filter 830 may perform one or more filtering operations on the reconstructed frame. The reference frame store 840 may store the filtered frame, where it may be used as a source of prediction of later-received pixel blocks. The syntax unit 870 may assemble a data stream from the coded pixel block data, which conforms to a governing coding protocol.

The pixel block coder 810 may include a subtractor 812, a transform unit 814, a quantizer 816, and an entropy coder 818. The pixel block coder 810 may accept pixel blocks of input data at the subtractor 812. The subtractor 812 may receive predicted pixel blocks from the predictor 850 and generate an array of pixel residuals therefrom representing a difference between the input pixel block and the predicted pixel block. The transform unit 814 may apply a transform to the sample data output from the subtractor 812, to convert data from the pixel domain to a domain of transform coefficients. The quantizer 816 may perform quantization of transform coefficients output by the transform unit 814. The quantizer 816 may be a uniform or a non-uniform quantizer. The entropy coder 818 may reduce bandwidth of the output of the coefficient quantizer by coding the output, for example, by variable length code words or using a context adaptive binary arithmetic coder.

The transform unit 814 may operate in a variety of transform modes as determined by the controller 860. For example, the transform unit 814 may apply a discrete cosine transform (DCT), a discrete sine transform (DST), a Walsh-Hadamard transform, a Haar transform, a Daubechies wavelet transform, or the like. In an aspect, the controller 860 may select a coding mode M to be applied by the transform unit 814, may configure the transform unit 814 accordingly, and may signal the coding mode M in the coded video data, either expressly or impliedly.

The quantizer 816 may operate according to a quantization parameter $Q_P$ that is supplied by the controller 860. In an aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 818, as its name implies, may perform entropy coding of data output from the quantizer 816. For example, the entropy coder 818 may perform run length coding, Huffman coding, Golomb coding, Context Adaptive Binary Arithmetic Coding, and the like.

The pixel block decoder 820 may invert coding operations of the pixel block coder 810. For example, the pixel block decoder 820 may include a dequantizer 822, an inverse transform unit 824, and an adder 826. The pixel block decoder 820 may take its input data from an output of the quantizer 816. Although permissible, the pixel block decoder 820 need not perform entropy decoding of entropy-coded data since entropy coding is a lossless event. The dequantizer 822 may invert operations of the quantizer 816 of the pixel block coder 810. The dequantizer 822 may perform uniform or non-uniform de-quantization as specified by the decoded signal $Q_P$. Similarly, the inverse transform unit 824 may invert operations of the transform unit 814. The dequantizer 822 and the inverse transform unit 824 may use the same quantization parameters $Q_P$ and transform mode M as their counterparts in the pixel block coder 810. Quantization operations likely will truncate data in various respects, and, therefore, data recovered by the dequantizer 822 likely will possess coding errors when compared to the data presented to the quantizer 816 in the pixel block coder 810.

The adder 826 may invert operations performed by the subtractor 812. It may receive the same prediction pixel block from the predictor 850 that the subtractor 812 used in generating residual signals. The adder 826 may add the prediction pixel block to the reconstructed residual values (output of the inverse transform unit 824) and may output reconstructed pixel block data.

The in-loop filter 830 may perform various filtering operations on recovered pixel block data once it is assembled into frames. For example, the in-loop filter 830 may include a deblocking filter 832, a sample adaptive offset ("SAO") filter 833, and/or other types of in loop filters (not shown). For example, the in-loop filter 830 may perform adaptive loop filtering (ALF), maximum likelihood (ML) based filtering schemes, deringing, debanding, sharpening, resolution scaling, and the like.

The reference frame store 840 may store filtered frame data for use in later prediction of other pixel blocks. Different types of prediction data are made available to the predictor 850 for different prediction modes. For example, for an input pixel block, intra prediction takes a prediction reference from decoded data of the same frame in which the input pixel block is located. Thus, the reference frame store 840 may store decoded pixel block data of each frame as it is coded. For the same input pixel block, inter prediction may take a prediction reference from previously coded and decoded frame(s) that are designated as reference frames. Thus, the reference frame store 840 may store these decoded reference frames.

As discussed, the predictor 850 may supply prediction blocks to the pixel block coder 810 for use in generating residuals. The predictor 850 may include an inter predictor 852, an intra predictor 853, and a mode decision unit 854. The inter predictor 852 may receive pixel block data representing a new pixel block to be coded and may search reference frame data from store 840 for pixel block data from reference frame(s) for use in coding the input pixel block. The inter predictor 852 may select prediction reference data that provide a closest match to the input pixel block being coded. The inter predictor 852 may generate prediction reference metadata, such as reference picture identifier(s) and motion vector(s), to identify which portion(s) of which reference frames were selected as source(s) of prediction for the input pixel block.

The intra predictor 853 may support Intra (I) mode coding. The intra predictor 853 may search from among pixel block data from the same frame as the pixel block being coded that provides a closest match to the input pixel block. The intra predictor 853 may also generate prediction mode indicators to identify which portion of the frame was selected as a source of prediction for the input pixel block.

The mode decision unit 854 may select a final coding mode from the output of the inter-predictor 852 and the intra-predictor 853. The mode decision unit 854 may output prediction data and the coding parameters (e.g., selection of reference frames, motion vectors, and the like) for the selected mode. The prediction pixel block data may be output to the pixel block coder 810 and pixel block decoder 820. The coding parameters may be output to a controller 860 for transmission to a channel. Typically, as described above, the mode decision unit 854 will select a mode that achieves the lowest distortion when video is decoded given a target bitrate. Exceptions may arise when coding modes are selected to satisfy other policies to which the coding system 800 adheres, such as satisfying a particular channel behavior, or supporting random access or data refresh policies.

In an aspect, multi-hypothesis coding may be employed, in which case operations of the inter-predictor 852, the intra-predictor 853, and the mode decision unit 854 may be replicated for each of a plurality of coding hypotheses. The controller 860 may control overall operation of the coding system 800. The controller 860 may select operational parameters for the pixel block coder 810 and the predictor 850 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 870, which may include data representing those parameters in the data stream of coded video data output by the system 800. The controller 860 also may select between different modes of operation by which the system may generate reference images and may include metadata identifying the modes selected for each portion of coded data.

During operation, the controller 860 may revise operational parameters of the quantizer 816 and the transform unit 814 at different granularities of image data, either on a per pixel block basis or on a larger granularity (for example, per frame, per slice, per largest coding unit ("LCU") or Coding Tree Unit (CTU), or another region). As discussed, the controller 860 may select coding modes, transform modes, and quantization parameters based on determinations of whether an input pixel block is obscured or not and, in some aspects, how the pixel block is obscured (e.g., whether partially- or fully-obscured).

Additionally, as discussed, the controller 860 may control the operations of the in-loop filter 830 and the prediction unit 850. Such control may include, for the prediction unit 850, mode selection (lambda, modes to be tested, search windows, distortion strategies, etc.), and, for the in-loop filter 830, selection of filter parameters, reordering parameters, weighted prediction, etc.

Figure 9:
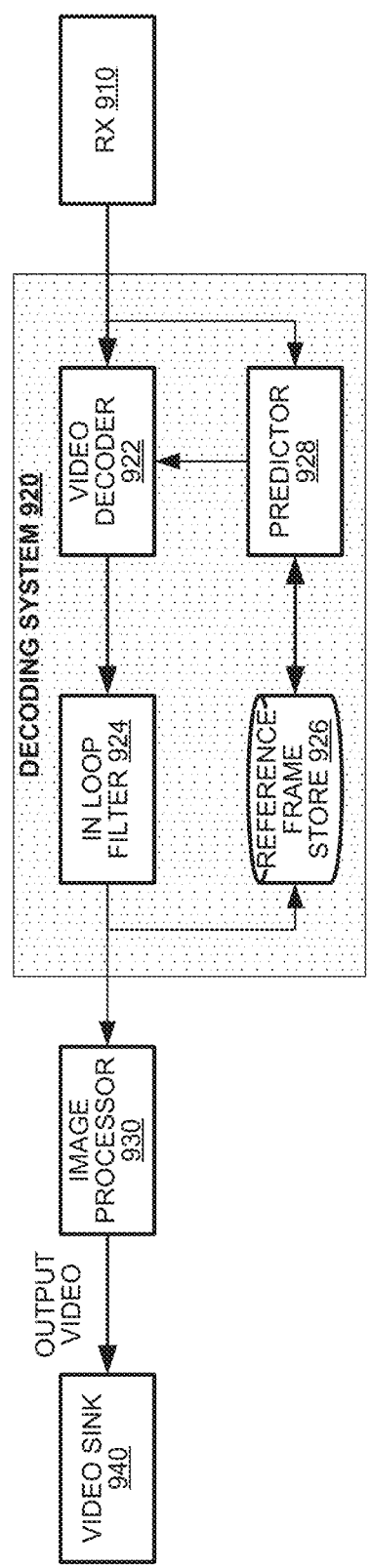
FIG. 9 is a functional block diagram illustrating components of a decoding terminal according to an aspect of the present disclosure.

FIG. 9 is a functional block diagram illustrating components of a decoding terminal according to an aspect of the present disclosure. The decoding terminal may include a receiver (RX) 910 that may receive coded video data from the channel, a video decoding system 920 that may decode the coded data, an image-processor 930, and a video sink 940 that may consume the video data.

The receiver 910 may receive a data stream from the network and may route components of the data stream to appropriate units within the terminal 900. Although FIGS. 2 and 9 illustrate functional units for video coding and decoding, terminals 110, 120 (FIG. 1) often will include coding/decoding systems for audio data associated with the video and perhaps other processing units (not shown). Thus, the receiver 910 may parse the coded video data from other elements of the data stream and route it to the video decoder 920.

The video decoder 920 may perform decoding operations that invert coding operations performed by the coding system 800. The video decoder may include a decoder 922, an in-loop filter 924, a reference frame store 926, and a predictor 928. The decoder 922 may invert the differential coding techniques applied by the coder 810 to the coded frames. The in-loop filter 924 may apply filtering techniques to reconstructed frame data generated by the decoder 922. For example, the in-loop filter 924 may perform various filtering operations (e.g., de-blocking, de-ringing filtering, sample adaptive offset processing, and the like). The filtered frame data may be output from the decoding system. The reference frame store 926 may store reconstructed reference frames for use in prediction operations. The predictor 928 may predict data for input pixel blocks from within the reference frames stored by the frame buffer according to prediction reference data provided in the coded video data. The video decoder 920 may operate according to the same coding protocol as the encoder, for example, HEVC, AVC, or H.263 coding protocols.

The image-processor 930 may perform operations to condition the reconstructed video data for display. For example, the image-processor 930 may perform various filtering operations (e.g., de-blocking, de-ringing filtering, and the like), which may remove or attenuate visual artifacts in the output video generated by the coding/decoding process. The image-processor 930 may also alter resolution, frame rate, color space, etc. of the reconstructed video to conform it to requirements of the video sink 940.

The video sink 940 represents various hardware and/or software components in a decoding terminal that may consume the reconstructed video. The video sink 940 typically may include one or more display devices on which reconstructed video may be rendered. Alternatively, the video sink 940 may be represented by a memory system that stores the reconstructed video for later use. The video sink 940 also may include one or more application programs that process the reconstructed video data according to controls provided in the application program. In some aspects, the video sink may represent a transmission system that transmits the reconstructed video to a display on another device, separate from the decoding terminal; for example, reconstructed video generated by a notebook computer may be transmitted to a large flat panel display for viewing.

Figure 10:
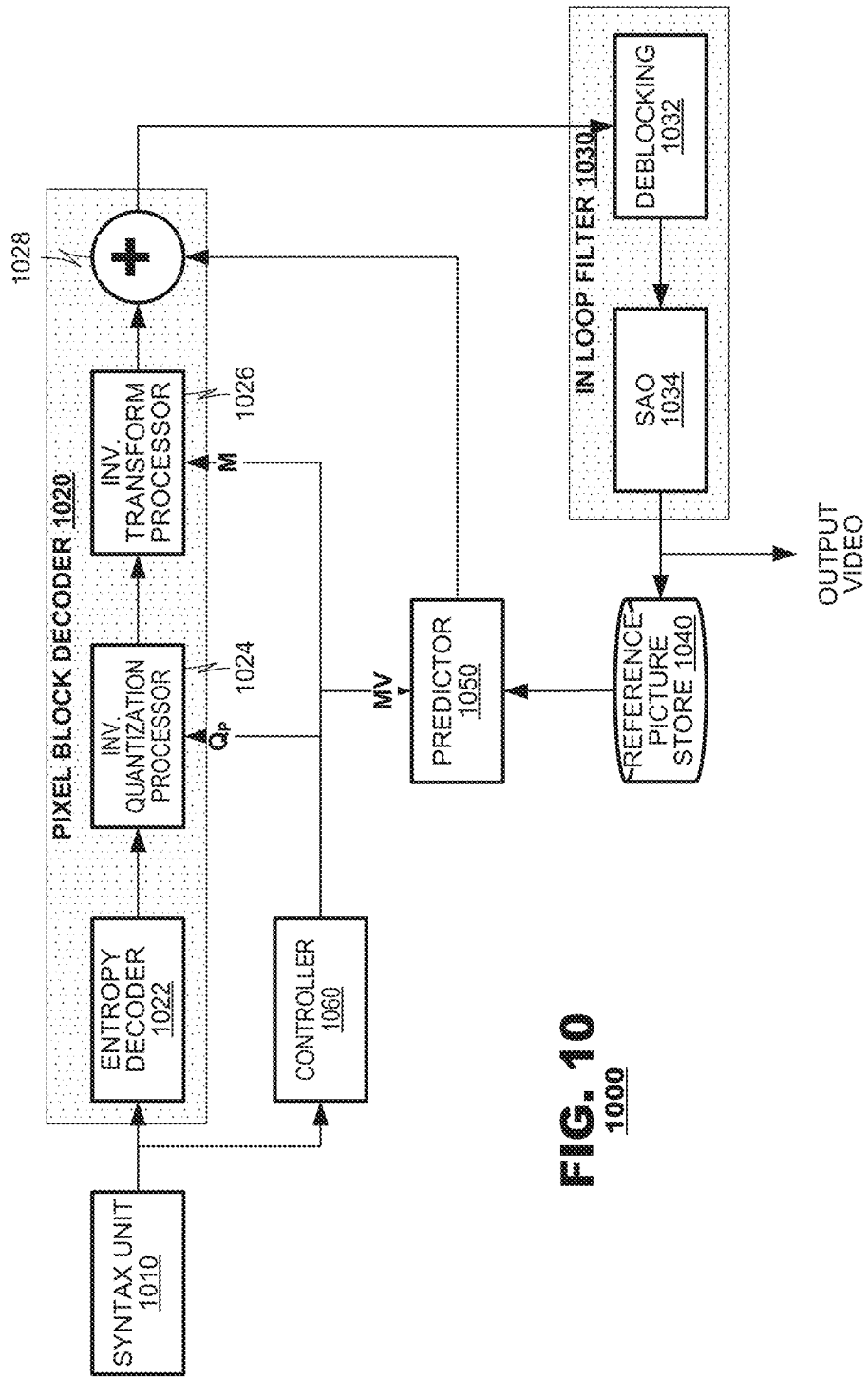
FIG. 10 is a functional block diagram of a decoding system according to an aspect of the present disclosure.

FIG. 10 is a functional block diagram of a decoding system 1000 according to an aspect of the present disclosure. The decoding system 1000 may include a syntax unit 1010, a pixel block decoder 1020, an in-loop filter 1030, a reference frame store 1040, a predictor 1050, and a controller 1060.

The syntax unit 1010 may receive a coded video data stream and may parse the coded data into its constituent parts. Data representing coding parameters may be furnished to the controller 1060, while data representing coded residuals (the data output by the pixel block coder 810 of FIG. 8) may be furnished to its respective pixel block decoder 1020. The predictor 1050 may generate a prediction block from reference data available in the reference frame store 1040 according to coding parameter data provided in the coded video data. It may supply the prediction block to the pixel block decoder 1020. The pixel block decoder 1020 may invert coding operations applied by the pixel block coder 810 (FIG. 8). The in-loop filter 1030 may filter the reconstructed frame data. The filtered frames may be output from the decoding system 1000. Filtered frames that are designated to serve as reference frames may also be stored in the reference frame store 1040.

The pixel block decoder 1020 may include an entropy decoder 1022, an inverse quantization processor (a dequantizer) 1024, an inverse transform unit 1026, and an adder 1028. The entropy decoder 1022 may perform entropy decoding to invert processes performed by the entropy coder 818 (FIG. 8). The dequantizer 1024 may invert operations of the quantizer 816 of the pixel block coder 810 (FIG. 8). Similarly, the inverse transform processor 1026 may invert operations of the transform unit 814 (FIG. 8). They may use the quantization parameters $Q_P$ and transform modes M that are provided in the coded video data stream. Because quantization is likely to truncate data, the pixel blocks recovered by the dequantizer 1024 will likely possess coding errors when compared to the input pixel blocks presented to the pixel block coder 810 of the encoder (FIG. 8).

The adder 1028 may invert operations performed by the subtractor 812 (FIG. 8). It may receive a prediction pixel block from the predictor 1050 as determined by prediction references in the coded video data stream. The adder 1028 may add the prediction pixel block to reconstructed residual values output by the inverse transform processor 1026 and may output reconstructed pixel block data.

The in-loop filter 1030 may perform various filtering operations on recovered pixel block data as identified by the coded video data. For example, the in-loop filter 1030 may include a deblocking filter 1032, a sample adaptive offset ("SAO") filter 1034, and/or other types of in loop filters. In this manner, operations of the in loop filter 1030 mimic operations of the counterpart in loop filter 830 of the encoder 800 (FIG. 8).

The reference frame store 1040 may store filtered frame data for use in later predictions of other pixel blocks. The reference frame store 1040 may store decoded frames as they are coded for use in intra prediction. The reference frame store 1040 may also store decoded reference frames.

As discussed, the predictor 1050 may supply the prediction blocks to the pixel block decoder 1020. The predictor 1050 may retrieve prediction data from the reference frame store 1040 represented in the coded video data.

The controller 1060 may control overall operation of the coding system 1000. The controller 1060 may set operational parameters for the pixel block decoder 1020 and the predictor 1050 based on parameters received in the coded video data stream. As is relevant to the present discussion, these operational parameters may include quantization parameters $Q_P$ for the dequantizer 1024 and transform mode parameters M for the inverse transform processor 1026. As discussed, the received parameters may be set at various granularities of image data, for example, on a per pixel block basis, a per frame basis, a per slice basis, a per LCU/CTU basis, or based on other types of regions defined for the input image.

The foregoing discussion has described operations of the aspects of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones, or computer servers. Such computer programs are typically stored in physical storage media such as electronic-, magnetic-based and/or optically-based storage devices, where they are read to a processor and executed. Decoders commonly are packaged in consumer electronics devices, such as smartphones, tablet computers, gaming systems, DVD players, portable media players, and the like; and they can also be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic, and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method for coding a video, comprising:
receiving metadata of a graphical element, the metadata identifies spatial location(s) within a frame of the video at which the graphical element is to be overlaid over the video;
partitioning each frame of the video into pixel blocks;
for each pixel block of the frame, selecting coding parameters based on a relation between the pixel block and the spatial location(s) of the graphical element in the frame, wherein the selecting comprises determining whether a pixel block is adjacent to the graphical element, and if the pixel block is determined to be adjacent to the graphical element, increasing a coding bitrate budget allocated to the pixel block;

coding the pixel blocks of the frame according to their respective selected coding parameters; and transmitting to a receiver the coded pixel blocks of the frame, an identifier of the graphical element, and a location of the graphical element.

2. The method of claim 1, further comprising transmitting the coded pixel blocks and their respective selected coding parameters to a receiver.

3. The method of claim 2, further comprising transmitting the metadata to the receiver.

4. The method of claim 1, wherein the metadata comprise one or more of a shape, a dimension, a texture, a location, a motion, or a perspective information of the graphical element.

5. The method of claim 1, wherein the selecting coding parameters for each pixel block comprises:
reducing a coding bitrate budget allocated to the respective pixel block in a spatial region where the pixel block overlaps the graphical element.

6. The method of claim 5, wherein the reducing a coding bitrate budget is proportional to the degree of overlap between the respective pixel block and the spatial region.

7. The method of claim 1, wherein the selecting coding parameters for each pixel block comprises:
applying a SKIP coding mode to the pixel block when the respective pixel block is fully obscured by the graphical element.

8. The method of claim 1, wherein the selecting coding parameters for each pixel block comprises decreasing an error resiliency coding strength for the pixel block when the respective pixel block overlaps the identified region.

9. The method of claim 8, wherein the decreasing an error resiliency coding strength comprises decreasing a number of bits allocated to forward error correction.

10. A method for coding a video, comprising:
receiving metadata of a graphical element to be overlaid over the video;
partitioning each frame of the video into pixel blocks;
for each pixel block, selecting coding parameters based on a relation between the pixel block and the graphical element by:
determining whether the pixel block is adjacent to the graphical element, and
if the pixel block is determined to be adjacent to the graphical element, increasing a coding bitrate budget allocated to the pixel block; and
coding the pixel blocks according to their respective selected coding parameters.

11. The method of claim 10, wherein the determining whether the pixel block is adjacent to the graphical element comprises:
recognizing an object in the video that the graphical element refers to; and
determining that the pixel block is associated with the recognized object.

12. The method of claim 10, wherein the determining whether the pixel block is adjacent to the graphical element is based on a correlation between characteristics of the pixel block and of the graphical element.

13. The method of claim 10, wherein the determining whether the pixel block is adjacent to the graphical element comprises determining that the pixel block is enclosed or pointed to by the graphical element.

14. The method of claim 10, further comprising, if the pixel block is determined to be adjacent to the graphical element, increasing an error resiliency coding strength for the pixel block.

15. The method of claim 14, wherein the increasing an error resiliency coding strength comprises increasing a number of bits allocated to forward error correction.

16. A computer system for coding a video, comprising:
at least one processor;
at least one memory comprising instructions configured to be executed by the at least one processor to perform a method comprising:
receiving metadata of a graphical element, the metadata identifies a region within the video at which the graphical element is to be overlaid over the video;
partitioning each frame of the video into pixel blocks;
for each pixel block, selecting coding parameters based on a relation between the pixel block and the identified region, wherein the selecting comprises determining whether each pixel block is adjacent to the graphical element, and if a pixel block is determined to be adjacent to the graphical element, increasing a coding bitrate budget allocated to the pixel block;
coding the pixel blocks according to their respective selected coding parameters; and
transmitting to a receiver the coded pixel blocks, their respective selected coding parameters an identifier of the graphical element stored by the receiver, and a location of the graphical element.

17. The system of claim 16, further comprising:
transmitting the metadata to the receiver, wherein the metadata comprise one or more of a shape, a dimension, a texture, a location, a motion, or a perspective information of the graphical element.

18. The system of claim 16, wherein the selecting coding parameters for each pixel block comprises:
reducing a number of bits allocated to the pixel block when the pixel block overlaps the identified region, the allocated bits are used for one of coding or forward error correction.

19. The system of claim 16, wherein the selecting coding parameters for each pixel block comprises:
applying a SKIP coding mode to the pixel block when the pixel block is fully obscured by the identified region.

20. The system of claim 16, wherein the selecting coding parameters for each pixel block comprises:
determining whether the pixel block is adjacent to the graphical element; and
if the pixel block is determined to be adjacent to the graphical element, increasing a number of bits allocated to the pixel block, the allocated bits are used for one of coding or forward error correction.

21. A non-transitory computer-readable medium comprising instructions executable by at least one processor to perform a method, the method comprising:
receiving metadata of a graphical element, the metadata identifies a region within a video at which the graphical element is to be overlaid over the video;
partitioning each frame of the video into pixel blocks;
for each pixel block, selecting coding parameters based on a relation between the pixel block and the identified region, wherein the selecting comprises determining whether each pixel block is adjacent to the graphical element, and if a pixel block is determined to be adjacent to the graphical element, increasing a coding bitrate budget allocated to the pixel block;
coding the pixel blocks according to their respective selected coding parameters; and
transmitting to a receiver the coded pixel blocks, their respective selected coding parameters an identifier of the graphical element stored by the receiver, and a location of the graphical element.

22. The medium of claim 21, further comprising:
transmitting the metadata to the receiver, wherein the metadata comprise one or more of a shape, a dimension, a texture, a location, a motion, or a perspective information of the graphical element.

23. The medium of claim 21, wherein the selecting coding parameters for each pixel block comprises:
reducing a number of bits allocated to the pixel block when the pixel block overlaps the identified region, the allocated bits are used for one of coding or forward error correction.

24. The medium of claim 21, wherein the selecting coding parameters for each pixel block comprises:
applying a SKIP coding mode to the pixel block when the pixel block is fully obscured by the identified region.

25. The medium of claim 21, wherein the selecting coding parameters for each pixel block comprises:
determining whether the pixel block is adjacent to the graphical element; and
if the pixel block is determined to be adjacent to the graphical element, increasing a number of bits allocated to the pixel block, the allocated bits are used for one of coding or forward error correction.

26. The method of claim 1, wherein the spatial locations are selected by tracking location of a predetermined object within the select frame(s).

27. The method of claim 1, wherein the select frame(s) are selected by:
identifying a predetermined event from content of the video, and
selecting frame(s) in which the predetermined event is identified.

28. The method of claim 1, wherein the select frame(s) are selected by:
identifying a predetermined facial feature from content of the video, and
selecting frame(s) in which the predetermined feature is identified.

* * * * *